United States Patent [19]

Yamamoto et al.

[11] Patent Number: 4,786,843
[45] Date of Patent: Nov. 22, 1988

[54] VEHICLE ILLUMINATION CONTROL CIRCUIT

[75] Inventors: Yukio Yamamoto, Atsugi; Daisuke Kobayashi, Zama, both of Japan

[73] Assignee: Nissan Motor Company, Ltd., Yokohama, Japan

[21] Appl. No.: 912,491

[22] Filed: Sep. 29, 1986

[30] Foreign Application Priority Data

Sep. 30, 1985 [JP] Japan .................. 60-214823

[51] Int. Cl.$^4$ ............................. B60Q 1/26
[52] U.S. Cl. .................... 315/77; 315/78; 315/83; 315/84; 307/10 LS; 307/10 R; 340/79; 340/76
[58] Field of Search .............. 340/74, 75, 79; 307/10 R, 10 LS, 10 BP, 11; 315/77, 78, 83, 84, 82

[56] References Cited

U.S. PATENT DOCUMENTS

| | | | |
|---|---|---|---|
| 3,628,085 | 12/1971 | Brock | 315/82 |
| 4,071,805 | 1/1978 | Brock | 315/84 |
| 4,123,668 | 10/1978 | Pecota | 315/84 |
| 4,376,909 | 3/1983 | Tagami et al. | 307/10 LS |
| 4,550,303 | 10/1985 | Steele | 315/82 |

Primary Examiner—David K. Moore
Assistant Examiner—Michael Razavi
Attorney, Agent, or Firm—Lowe, Price, LeBlanc, Becker & Shur

[57] ABSTRACT

In order to permit the simultaneous variation of the illumination of a clock and the illumination of instruments included in an instrument panel of an automotive vehicle or the like, a single illumination control device is connected with the ignition switch and a lighting control switch in a manner that when the lighting switch is on, the voltage applied to the bulbs which illuminate the clock and the instrument panel are simultaneously controlled while the tail lamp bulbs are constantly energized to their normal level when only the ignition switch is on, current is fed to the clock illumination bulb. The resistance inherently provided by the plurality of bulbs used in the instrument panel and tail lamp assemblies prevents illumination of the same under such circumstances.

10 Claims, 3 Drawing Sheets

VEHICLE ILLUMINATION CONTROL CIRCUIT

OF THE INVENTION

1. Field of the Invention

The present invention relates generally to an illumination control circuit used in an automotive vehicle or the like and more specifically to such a circuit which is simple and which permits the selective control of the illumination intensity of various instruments, clocks, and the like in an instrument cluster using a single control element.

2. Description of the Prior Art

Automotive vehicles inevitably include electrical circuits for controlling the operation of the vehicle headlights, tail lamps, instrument cluster meter illumination bulbs, clock illumination bulb, cabin light and the like. FIG. 1 shows an example of such a circuit wherein a battery 1, a fusible link 2, an ignition switch 3, circuit protection fuses 4 and 6, and a lighting switch 5 are connected as shown. In this circuit a clock 7 is illuminated by a bulb 7a included in the device. Bulbs 8 are incorporated in the instrument panel for the purposes of illuminating the various instruments such as the speedometer, tachometer and the like. Tail lamp bulb 9 and clearance lamp bulb(s) 10 are included in the circuit. It should be noted that elements 9 and 10 are usually disposed together in the same tail lamp assembly.

In order to control the brightness of the instrument panel illumination brightness control circuit 11 is in circuit with bulbs 8. To prevent reverse flow of current in the circuit diodes 12 and 13 are disposed "upstream" of the clock 7 as shown. A relay 14 is provided to control the brightness of the clock illumination. This relay includes an arm which in the absence of energization of coil 14a of the relay, engages contact a.

With this arrangement when the ignition switch 3 is set to the ON position the bulb 7a of the clock is illuminated by the supply of electric current via fuse 6 and diode 13. When the lighting switch 5 is set to its ON position the instrument panel illuminating bulbs 8 and those included in the tail lamp arrangement (viz., 9 and 10) are illuminated. The voltage applied to bulbs 8 can be regulated via control element 11. Upon closure of switch 5 current is also supplied to coil 14a of relay 14 in a manner which causes the relay arm to switch from contact a to contact b. This connects resistance 15 in series with bulb 7a thus reducing the amount of illumination derived thereby.

With the above described arrangement even though the amount of illumination provided by the bulbs 8 can be selectively adjusted at will the illumination control of bulb 7a is controlled by the switching or non-switching of the relay between two fixed values and thus inevitably induces the drawback that the amount of illumination of the clock display and the other instruments is different and detracts from the easthetic value of the instrument array.

Hitherto it has been difficult to overcome this problem without resorting to the introduction of an addition control circuit.

SUMMARY OF THE INVENTION

It is an object of the present invention to provide an illumination control circuit for an automotive vehicle or the like which is simple and which enables the illumination of the various instruments clocks etc., to be controlled without the need to introduce additional control circuits for said purpose.

In brief, in order to permit the simultaneous variation of the illumination of a clock and the illumination of instruments included in an instrument panel of an automotive vehicle or the like, a single illumination control device is connected with the ignition switch and a lighting control switch in a manner that when the lighting switch is on, the voltage applied to the bulbs which illuminate the clock and the instrument panel are simultaneously controlled while the tail lamp bulbs are constantly energized to their normal level, and when only the ignition switch is on, current is fed to the clock illumination bulb. The resistance inherently provided by the plurality of bulbs used in the instrument panel and tail lamp assemblies uniquely functions to prevent illumination of the same under such circumstances.

More specifically, the present invention takes the form of an electrical circuit for a vehicle which includes: a source of EMF; a first switch; a second switch; a first device having a display; a first illumination device for illuminating the display of the first device; a first group of illumination devices; a second group of illumination devices; an illumination control device; a circuit arrangement which includes means defining a first electrical path which includes the first illumination device, a second electrical path which includes the first group of illumination devices and a third electrical path which includes the third group of illumination devices, the circuit arrangement operatively interconnecting the first and second switches and the illumination control device in a manner whereby, when the first switch is closed and the second switch is open electric current is supplied to the illumination control device via the first path including the first illumination device and the second path including the first group of illumination devices, and to the second group of illumination devices through the third path; and when the second switch is closed and the first switch is open electrical current is supplied to the first illumination device through the first path, the second and third paths being arranged with respect to the first path in a manner that even though an electrical connection is established therebetween the combined resistance of the first and second groups of illumination devices prevents current flow therethrough.

DETAILED DESCRIPTION OF THE PREFERRED EMBODIMENTS

Figure 1:
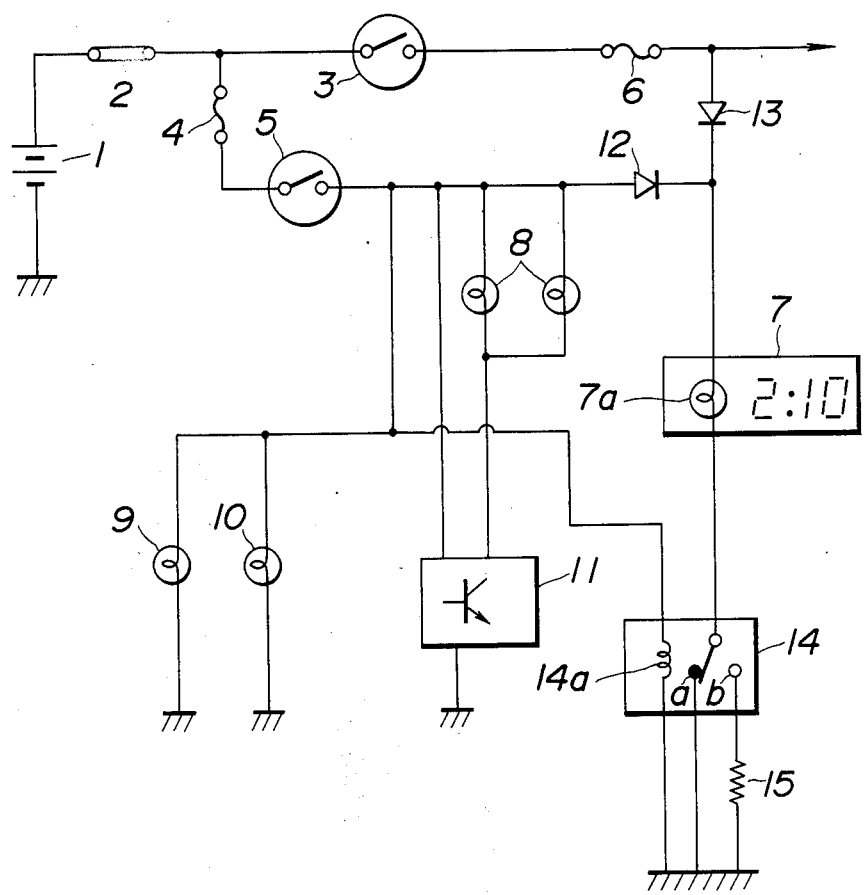
FIG. 1 is a schematic diagram showing the prior art circuit discussed in the opening paragraphs of the instant disclosure.
Figure 2:
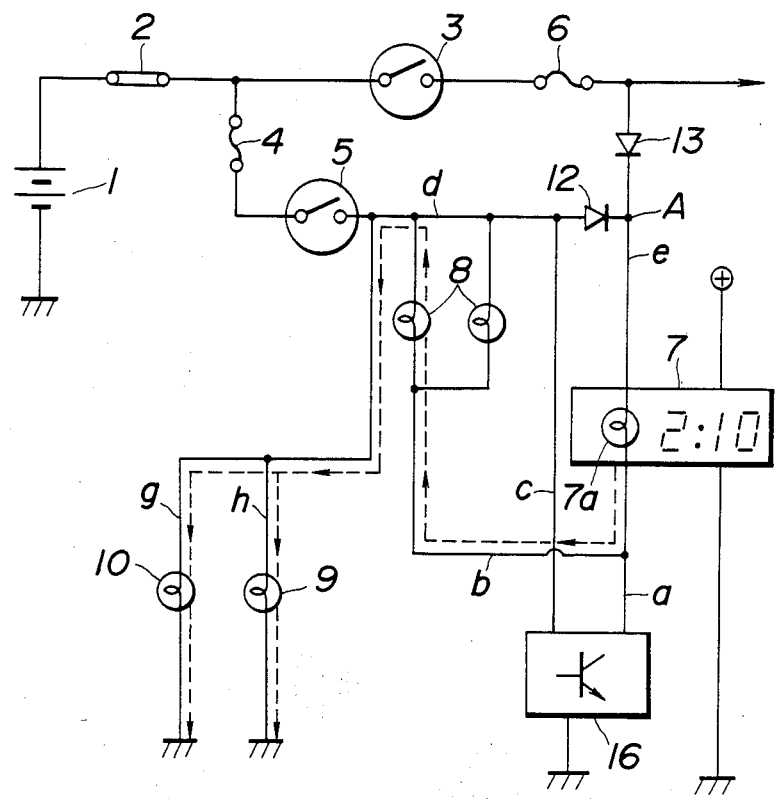
FIGS. 2 and 3 respectively are circuit diagrams of first and second embodiments of the circuit according to the present invention.

FIG. 2 is a circuit diagram of a first embodiment of the present invention. In this arrangement, which is essentially similar to that of the prior art discussed hereinbefore save that the relay 14 of the prior art is omitted and a brightness control circuit 16 which is essentially the same as element 11 of the arrangement shown in FIG. 1, is connected with clock illumination bulb 7a via power supply line a. Bulbs 8 are connected with line a via line b.

With this arrangement when lighting switch 5 is set to its ON position voltage is applied to the illumination level control circuit via lines d and c. Simultaneously, current flows through lines d, e and a to illuminate bulb 7a and through lines d, b and a to illuminate bulbs 8 of the instrument panel illumination arrangement. As both of these flows are grounded through the illumination control circuit 16 it is possible to simultaneously vary the amount of illumination of of bulbs 7a and 8 and avoid any disturbing different in illumination intensity. Under these conditions bulbs 8, 9 and 10 are also illuminated.

In the case wherein switch 5 is OFF and only ignition switch 3 is set to its ON position (viz., the ignition key is rotated to at least the ACS position wherein energization of auxiliary electrical devices is permitted) voltage is applied to the illumination control circuit 16 and bulb 7a via diode 13 lines e and a in a manner which permits illumination of bulb 7a. However, under these conditions even through a circuit between line a and bulbs 8, 9 and 10 exists (see the broken in FIG. 2), in actual practice there is a large number of bulbs (for example 5-6 instrument panel illumination bulbs and 6 tail lamp and clearance lamp bulbs) the total resistance of the same is sufficient to prevent current from passing therethrough. Further, under these conditions even though current is not supplied to illumination control circuit 16 via line c and control of the illumination of bulb 7a is not possible, it is still possible to set the level of illumination to a suitable level so the clock may be easily read.

Figure 3:
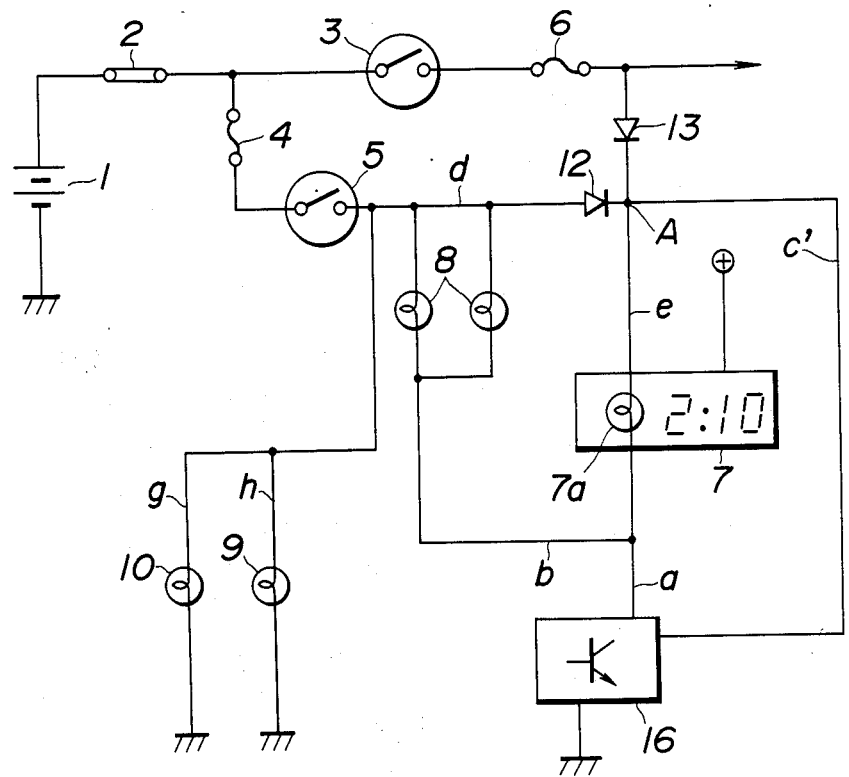

FIG. 3 is a circuit diagram of a second embodiment of the present invention. This circuit arrangement is essentially the same as that shown in FIG. 2 and differs in that a line c' is provided to establish electrical connection between junction A and the illumination control circuit 16 and thus enable this circuit when either of the ignition switch 3 or the lighting switch 5 is set to its respective ON position. This makes it possible to adjust the level of clock illumination even when the the lighting switch is not switched on.

With this embodiment also it is possible, when switch 5 is closed, to simultaneously adjust the illumination level of both the clock and the instrument panel in a manner which permits the desired balance to be achieved.

What is claimed is:
1. In an electrical circuit for a vehicle
   a source of EMF;
   a first switch;
   a second switch;
   a first device having a display;
   a first illumination device for illuminating the display of said first device;
   a first group of illumination devices;
   a second group of illumination devices;
   an illumination control device;
   a circuit arrangement, said circuit arrangement including means defining a first electrical path which includes said first illumination device, a second electrical path which includes said first group of illumination devices and a third electrical path which includes said second group of illumination devices, said circuit arrangement operatively interconnecting said first and second switches and said illumination control device in a manner whereby:
   when said first switch is closed and said second switch is open electrical current is supplied to said illumination control device via said first path including said first illumination device and said second path including said first group of illumination devices, and to said second group of illumination devices through said third path; and
   when said second switch is closed and said first switch is open electrical current is supplied to said first illumination device through said first path, said second and third paths being arranged with respect to said first path in a manner that an electrical connection is established therebetween the combined resistances of said first and second groups of illumination devices in said electrical connection limiting current flow through said first and second groups of devices to a value that prevents illumination of said first and second groups of illumination devices.

2. An electrical circuit as claimed in claim 1, wherein said illumination control device is selectively operable to vary the amount of electrical current passes through said first and second electrical paths.

3. An electrical circuit as claimed in claim 1, wherein said illumination control device is supplied with electrical current and thus rendered operative only when said first switch is closed.

4. An electrical circuit as claimed in claim 1, wherein said illumination control device is supplied with electrical current and thus rendered operative when either of said first and second switches is closed.

5. An electrical circuit as claimed in claim 1, wherein said first device takes the form of a clock, said first group of illumination devices take the form of a plurality of light emitting elements which illuminate the instruments in an instrument panel and said second group of illumination devices take the form of light emitting devices included in a lamp assembly which produces illumination which is visible from outside the vehicle.

6. An illumination control circuit for an automobile vehicle having a battery, a ground, an ignition switch, a light control switch, a first instrument lamp, a second instrument lamp, and an exterior lamp comprising first, second and third branch circuits respectively including said first instrument lamp, said second instrument lamp and said exterior lamp, a lamp controller having first, second and third terminals, said third terminal being grounded, said second terminal being connected to electrodes of the first and second instrument lamps, and circuit means connecting said first, second and third branches with each other and said first and second terminals as well to said battery, ground, ignition switch and light control switch so that in response to:
   (a) the ignition switch being open while the light control switch is closed, current flows from an ungrounded terminal of the battery through the light control switch to
      (i) the first terminal and to the second terminal via the first instrument lamp in the first branch circuit in parallel with the second instrument lamp in the second branch circuit, and
      (ii) to ground via the exterior lamp in the third branch circuit; and
   (b) the ignition switch being closed while the light control switch is open, current flows from the ungrounded terminal of the battery through the ignition switch to the lamps in the first, second and third branch circuits, the lamps in the second and third branch circuits being connected so substantially the same current flows through them, the series resistances of the lamps of the second and third branch circuits being such that the lamps of the second and third branch circuits are not illuminated in response to substantially the same current flowing through them.

7. The circuit of claim 6 wherein the circuit means includes means for connecting said first, second and third branches with each other and said first and second terminals so that in response to the ignition and light control switches being simultaneously closed current flows from said ungrounded terminal through said closed light control switch to ground via the exterior lamp in the third branch circuit and substantially the same current amplitudes flow from the ungrounded terminal through the lamps of the first and second branch circuits to the second terminal.

8. The circuit of claim 6 wherein the circuit means includes diode means poled to pass current through the closed ignition switch to the first instrument lamp and to block current flow in parallel from the ungrounded terminal to the second and third branch circuits while the ignition switch is closed and the light control switch is open.

9. The circuit of claim 8 wherein the diode means includes first and second diodes having like first electrodes connected to one terminal of the first branch circuit and like second electrodes respectively connected to a terminal of the ignition switch and a terminal of the light control switch.

10. In an electrical circuit for a vehicle
a source of EMF;
a light control switch;
an ignition switch;
a first device having a display;
a first illumination device for illuminating the display of said first device;
a group of instrument illumination devices;
a group of exterior illumination devices;
an illumination control device;
a circuit arrangement, said circuit arrangement including means defining a first electrical path which includes said first illumination device, a second electrical path which includes said group of instrument illumination devices and a third electrical path which includes said group of exterior illumination devices, said circuit arrangement operatively interconnecting said light control and ignition switches and said illumination control device in a manner whereby:
when said light control switch is closed and said ignition switch is open electric current is supplied to said illumination control device via said first path including said first illumination device and said second path including said group of instrument illumination devices, and to said group of exterior illumination devices through said third path; and
when said ignition switch is closed and said light control switch is open electric current is supplied to said first illumination device through said first path, said second and third paths being arranged with respect to said first path in a manner that an electric connection is established therebetween, the combined resistances of said groups of instrument and exterior illumination devices in said electric connection limiting current flow through said groups of instrument and exterior illumination devices to a value that prevents illumination of said groups of instrument and exterior illumination devices.

* * * * *